United States Patent
Benaboud et al.

(10) Patent No.: US 7,800,926 B2
(45) Date of Patent: Sep. 21, 2010

(54) METHOD OF CONTROLLING A THREE LEVEL CONVERTER

(75) Inventors: Aziza Benaboud, Sale (MA); Alfred-Christophe Rufer, Villars-sous-Yens (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/341,416

(22) Filed: Dec. 22, 2008

(65) Prior Publication Data
US 2009/0161398 A1    Jun. 25, 2009

Related U.S. Application Data

(63) Continuation of application No. PCT/EP2007/054470, filed on May 9, 2007.

(30) Foreign Application Priority Data
Jun. 22, 2006   (EP)   ................... 06115873

(51) Int. Cl.
  H02M 7/758 (2006.01)
  H02M 1/36 (2007.01)
(52) U.S. Cl. .............. 363/43; 363/37; 363/49
(58) Field of Classification Search .......... 363/37, 363/43, 49, 34, 41; 323/205, 207; 322/20, 322/258
See application file for complete search history.

(56) References Cited

U.S. PATENT DOCUMENTS

| | | | |
|---|---|---|---|
| 4,739,464 A | 4/1988 | Nishihiro et al. | |
| 5,594,636 A | 1/1997 | Schauder | |
| 6,031,738 A * | 2/2000 | Lipo et al. | ............. 363/37 |
| 6,882,060 B2 * | 4/2005 | Matsuo et al. | ............ 290/52 |

(Continued)

FOREIGN PATENT DOCUMENTS

DE    103 30 473 A1    1/2005

(Continued)

OTHER PUBLICATIONS

A. Benaboud and A. Rufer, A Flexible, High Efficiency, VSI-based HVDC Transmission System with Reduced Harmonics, Jun. 2008, IEEE Power Electronics Specialists Conference, pp. 4117-4123.*

(Continued)

Primary Examiner—Harry Behm
(74) Attorney, Agent, or Firm—Buchanan Ingersoll & Rooney PC

(57) ABSTRACT

A system and method are disclosed for controlling an inverter to provide an alternating inverter voltage to a load for a transition in which a change in active power (P) and/or reactive power (Q) within a transition time ($T_{tr}$) is carried out. The method includes converting a direct current voltage ($U_{dc}$) into an alternating inverter voltage ($V_{inv}$) with a basic frequency ($\omega$); and selecting a transition time $T_{tr}$ for a change in active power (P) and/or reactive power (Q) within a load to be supplied the alternating inventor voltage. To address DC offsets, the transition time $T_{tr}$ is chosen such that in an equation which is a function of the fundamental period of the basic frequency and the target phase angle after the transition between the inverter voltage $V_{inv}$ and the load voltage $V_n$, a variable k is a small integer number between 1-8.

23 Claims, 18 Drawing Sheets

U.S. PATENT DOCUMENTS 6,987,331 B2 * 1/2006 Koeppe et al. ............... 307/66
2006/0214645 A1 9/2006 Rufer et al.

FOREIGN PATENT DOCUMENTS

EP 0 220 638 A2 5/1987

OTHER PUBLICATIONS

Laszlo Gyugyi, Kalyan Sen, Colin Schauder, The Interline power flow controller concept: a new approach to power flow management in transmission systems, Jul. 1999, IEEE Transactions on Power Delivery, vol. 14, Issue 3, pp. 1115-1123.*

B. Dakyo et al , "End user three levels VS1 for a single-phase photovoltaic grid connected application," 9th European Conference on Power Electronics and Applications, EPE 2001, pp. 1-4.

European Search Report for EP 06 11 5873.9, completed Mar. 1, 2007.

International Search Report for PCT/EP2007/054470, completed Jan. 14, 2008.

Written Opinion of the International Searching Authority for PCT/EP2007/054470, completed Jan. 14, 2008.

* cited by examiner

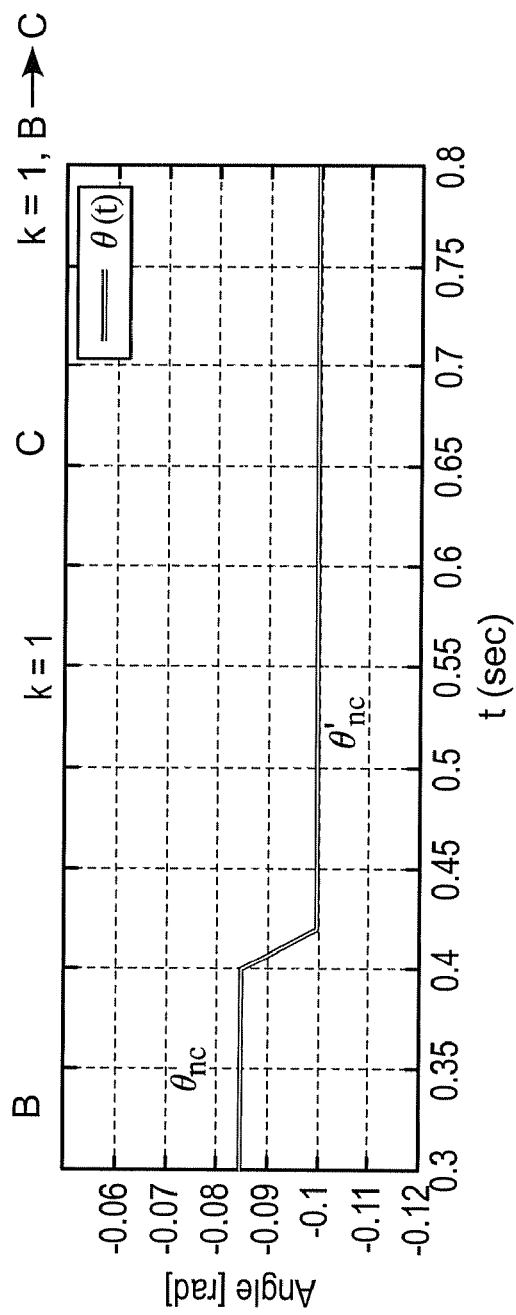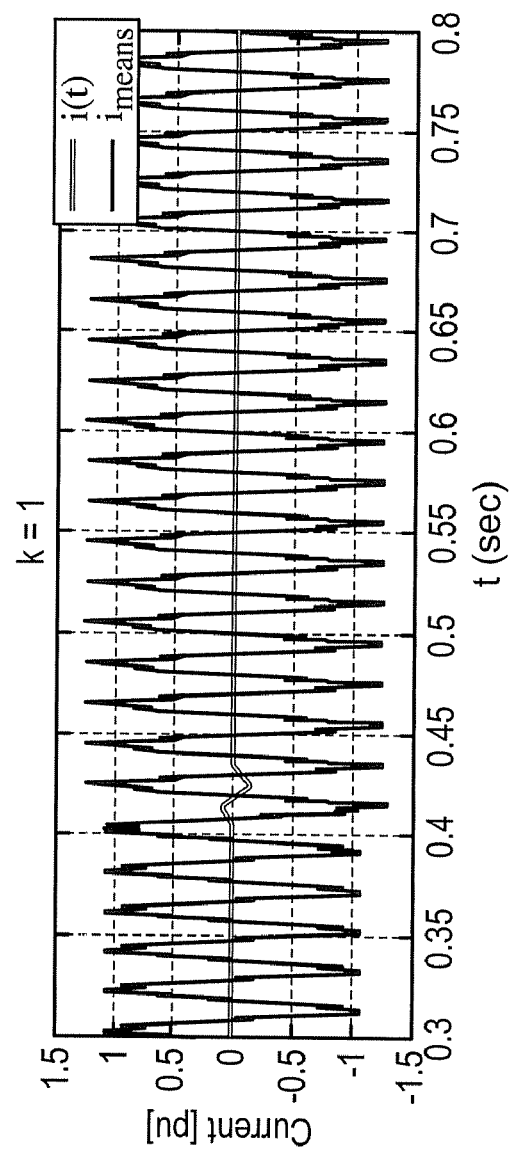
Fig. 13a
Fig. 13b

METHOD OF CONTROLLING A THREE LEVEL CONVERTER

RELATED APPLICATIONS

This application claims priority under 35 U.S.C. §119 to European Patent Application No. 06115873.9 filed in Europe on Jun. 22, 2006 and as a continuation application under 35 U.S.C. §120 to PCT/EP2007/054470 filed as an International Application on May 9, 2007 designating the U.S., the entire contents of which are hereby incorporated by reference in their entireties.

TECHNICAL FIELD

A method is disclosed for controlling an inverter converting direct input voltage into alternating inverter voltage with a basic frequency for providing it to a load. Such a method can be used, for example, within a frequency converter having an inverter and a corresponding rectifier, both of which can be operated in square wave modulation mode.

BACKGROUND INFORMATION

Variable-speed generators or, generally speaking, generators having a frequency that diverges from the grid frequency can be connected to the electrical power grid by converters that adapt the voltage and the frequency being generated by the generator to the voltage and the frequency of the electrical power grid. Various devices are used as converters for this purpose such as, for instance, so-called direct converters, with which the two different voltages and frequencies are adjusted relative to each other, for example, using semiconductor switches (e.g. thyristors or gate turn-off thyristors—GTOs) in a direct conversion (AC/AC). Such direct converters exist, for instance, as so-called cyclo-converters or as so-called matrix converters (described, for example, in U.S. Pat. No. 5,594,636). In the case of a natural commutation, they can generate frequency components of a low-frequency that are undesired and difficult to eliminate, while in the case of forced commutation, they can entail large switching losses.

As an alternative, it is possible to ensure a voltage-adapted and frequency-adapted connection of a generator to an electrical power grid in the form of an indirect conversion. With such a conversion, first of all, a rectifier produces a direct current from the alternating current generated by the generator and, in an inverter, this direct current is subsequently matched to the voltage and frequency of the electrical power grid. Such controlled converters likewise make use of semi-conductor switches (for instance, GTOs, insulated gate bipolar transistors—IGBTs, metal oxide semiconductor field-effect transistors—MOSFETs, or integrated gate commutated thyristors—IGCTs) and they can entail large switching losses at the switching frequencies employed.

Such a system and a mode of its operation is, for example, described in DE 103 30 473 A1. In this document, a method and a device for adapting the alternating current generated by a generator and the alternating voltage generated by a generator to a grid are proposed. The generator has at least one excitation coil and the power fed into the grid can be flexibly adapted while reducing switching losses in that a static frequency converter is employed for the adaptation between the generator and the grid, and in that, in order to control the power fed into the grid, means are provided with which, on the one hand, the strength of the excitation field generated by the at least one excitation coil is regulated and, on the other hand, the phase angle between the frequency converter voltage and the generator or grid voltage is appropriately controlled.

SUMMARY

A method is disclosed for controlling an inverter to provide an alternating inverter voltage to a load for a transition in which a change in active power (P) and/or reactive power (Q) within a transition time ($T_{tr}$) is carried out, the method comprising: converting a direct current voltage ($U_{dc}$) into an alternating inverter voltage ($V_{inv}$) with a basic frequency ($\omega$); and selecting a transition time $T_{tr}$ for a change in active power (P) and/or reactive power (Q) within a load to be supplied the alternating inventor voltage such that in an equation $$T_{tr} = kT_f - \frac{\theta_{nc}}{\omega} \tag{10}$$

k is an integer number between 1-8, wherein $T_f$ is a fundamental period and is defined as $$T_f = \frac{2\pi}{\omega}$$

and wherein $\theta_{nc}$ is a target phase angle after a transition between the inverter voltage $V_{inv}$ and a load voltage $V_n$.

BRIEF DESCRIPTION OF THE DRAWINGS

The drawings are for the purpose of illustrating preferred embodiments of the invention and not for the purpose of limiting the same. The drawings illustrate, for example, a fast-ramping DC elimination strategy for AC currents.

In the accompanying drawings, exemplary embodiments of the disclosure are shown in which:

FIG. 13 shows the second transition from B to C for k=1.0, wherein a) shows the angle shift and b) shows the current;

DETAILED DESCRIPTION

Figure 1:
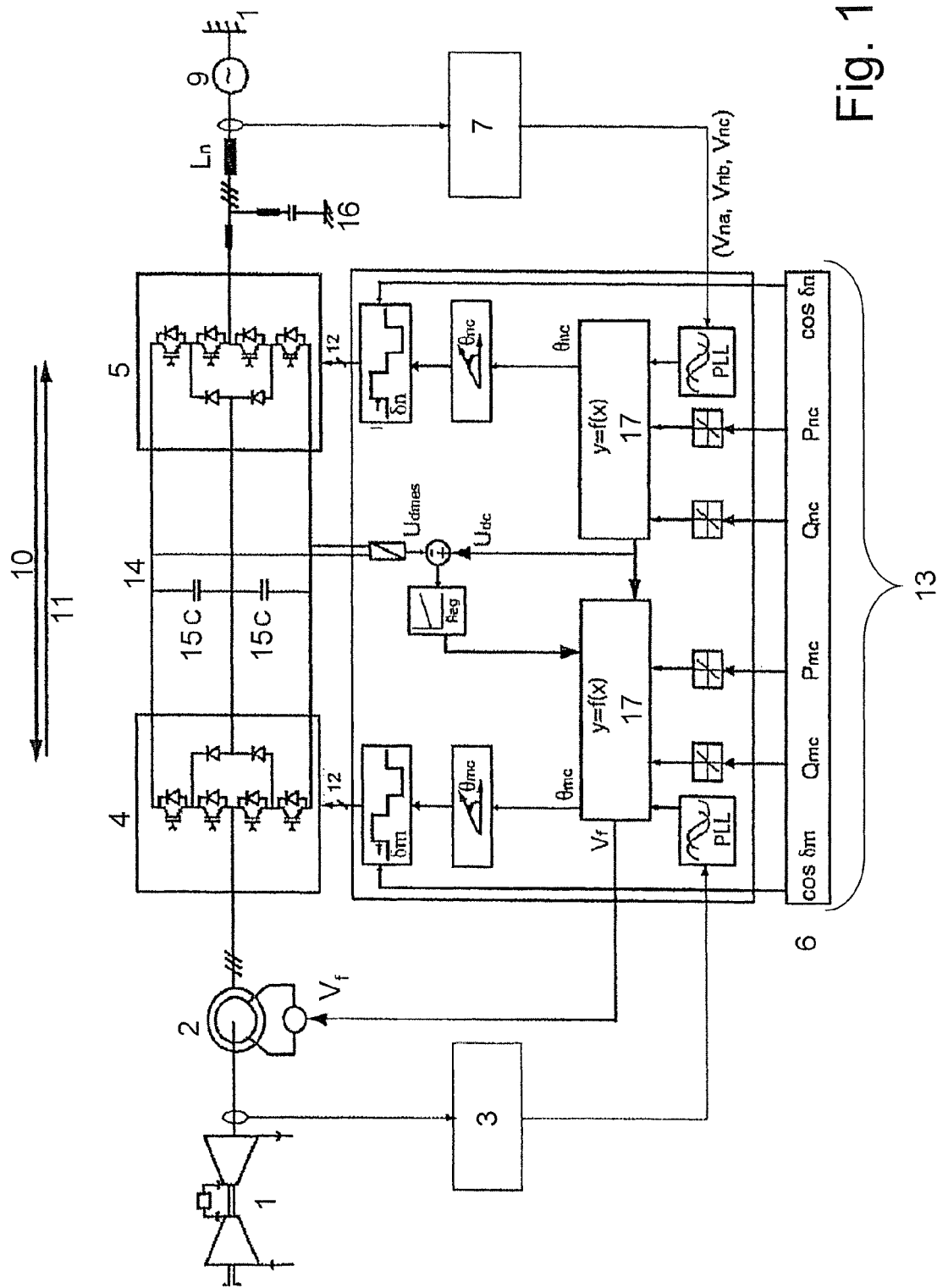
FIG. 1 shows a schematic diagram of an exemplary application using a three level converter.

A system and method of operation are disclosed which can include use with, for example, a full static frequency converter and/or just for an inverter part of a frequency converter.

An exemplary system and method are disclosed for controlling an inverter converting direct input voltage $U_{dc}$ into alternating inverter voltage $V_{inv}$ with a basic frequency ω. The alternating inverter voltage can, for example, be provided to a load. The exemplary system and/or method can be used for transitions in which a change in active power P and/or reactive power Q within a transition time $T_{tr}$ is to be implemented.

Surprisingly it was found that fast ramping control without a drawback of DC offsets is unexpectedly possible. By clever reduction of a circuit for simulation, very fast transitions compared to the output frequency are possible if the transition time $T_{tr}$ is chosen such that in the equation:

$$T_{tr} = kT_f - \frac{\theta_{nc}}{\omega}$$

k is small integer number below 10, more specifically an integer number between 1-8 (so k=1, 2, 3, 4, 5, 6, 7, or 8), wherein $T_f$ is a fundamental period and is defined as $$T_f = \frac{2\pi}{\omega}$$

and wherein $\theta_{nc}$ is a target phase angle after transition between an inverter voltage $V_{inv}$ and a load voltage $V_n$.

An exemplary feature of the disclosure is the discovery that specifically for small integer values of k unexpectedly there is no or substantially no DC-offsets in the mean line current.

It should be noted that essentially the same result can be obtained if k is chosen to be very close to such an integer value, and for example a deviation of k less than or equal to, for example, about 0.05 from these integer values will lead to some DC offset but only of minor importance.

In a first exemplary embodiment of the present disclosure, k is chosen to be a very small integer number between 1-5, or preferably even 1 or 2. If the value of k is chosen in this manner, extremely short and previously unknown transition times are possible without drawbacks in terms of DC offsets in the line current.

The inverter can be operated in basic frequency clocking. For example, the inverter can be configured as a three level inverter including, but not limited to, a Neutral Point Clamped (NPC) inverter.

Exemplary advantages of the above choice of the transition time can be pronounced if the inverter is operated in, for example, square wave modulation.

An exemplary application of the method is to be seen in the field of frequency converters. More specifically, application of the present method is useful in the context of the above-mentioned state-of-the-art, such as in the context of a design according to DE 103 30 473 A1. As pertains to the details of the static frequency converter and its mode of operation, the complete disclosure of DE 103 30 473 A1 is hereby incorporated by reference in its entirety into this disclosure. The above disclosed exemplary method for operation of an inverter can, for example, be used to improve the control of the inverter part disclosed in DE 103 30 473 A1.

In an exemplary embodiment, a method as disclosed herein can be applied to an inverter which is together with or in combination with or in connection with a rectifier to form a static frequency converter. For example, this static frequency converter can be a three level converter including, but not limited to, a Neutral Point Clamped converter.

In the latter case, according to an exemplary embodiment, both the rectifier as well as the inverter are operated in square wave modulation (SWM).

As detailed in DE 103 30 473 A1, an output amplitude of the frequency converter can be controlled by means for controlling an amplitude of the input of the rectifier and/or by means for controlling de-phasing between a load and the inverter voltage.

Correspondingly, the above method can, for example, be used for the conversion of alternating current generated by a (for example, fast running) synchronous generator, such as a generator driven by a gas turbine, into alternating current to be provided to a grid or network. It may however also be used, for example, with a static compensator for static compensation of reactive power or for analogous applications.

1 Introduction

The present application discloses a new system and control strategy which can, for example, be used for a three level converter with Neutral Point Clamped (NPC) topology, characterized by high efficiency due to the use of square wave modulation or SWM. An exemplary advantage of this mode is the quasi absence of switching losses. The produced active and reactive power can be controlled by voltage magnitude adaptation in the input of the inverter (DC side), together with the de-phasing between the grid and output inverter voltages. An exemplary context of the use of this control is given by a special frequency converter, where the ratio between input and output voltage is kept constant, by using a square wave operation mode at both the input and the output sides, as it is described in DE 103 30 473 A1, which document has already been mentioned above.

FIG. 1 illustrates an exemplary application of a frequency converter 13, as an interface between a fast running synchronous generator 2, driven by a gas turbine 1 and a grid or network 9. In this application, the converter 13 can be designated as a "frequency only converter", due to a fixed ratio between the input output voltage magnitude. Voltage adaptation, used for the power flow control through the network, can be achieved by changing the generator's excitation.

In FIG. 1 the static frequency converter is given by a rectifier 4 and an inverter 5, which are joined via a DC link 14. In this link capacitors 15 are provided. An exemplary control means is represented as a control unit or section that is provided with any or all of the components shown in FIG. 1 for controlling the converter 13. For example, position information from a gas turbine is provided to the control section by the position encoder 3, and inputs from main references 6, provided as reference signal inputs of the control section, are indicated on the bottom of the Figure. Depending on a desired output amplitude, in calculation units 17 necessary current/voltage for feeding the excitation system of the synchronous generator 2 is calculated and input to the generator 2, rectifier 4 and/or inverter 5. Actual output conditions of the system are provided to the control section by a voltage transducer 7. Furthermore it is possible to provide a filter 8 (for example, an RC network) on the output side of the inverter.

On top of FIG. 1, it is indicated schematically that such a system can be operated for starting up the gas turbine (arrow 10, start-up direction) or it can be operated for the production of energy (arrow 11, energy production direction).

In this exemplary application, the line side control is of main concern. As a simplification, the synchronous generator 2 and its rectifier 4 can be replaced by an adjustable DC voltage source 18 at the input of the inverter 5 (see FIG. 2).

Simulation results with different operating points and transitions between them can highlight capabilities of the proposed control strategy. These include the ability to operate with unity power factor and better current quality. For this point many authors emphasize low total harmonic distortion or high efficiency, however there are only few concerning the DC component reduction.

An exemplary aim of the present application is to describe a new fast-ramping DC elimination strategy for AC currents.

The following portions of the specification are organized as follows:

Section 2 presents an exemplary dedicated control strategy including dynamic regime. Section 3 describes an exemplary method to eliminate a DC component. Section 4 describes an exemplary simulation result. Section 5 constitutes a conclusion section.

2 Exemplary Dedicated Control Strategy

Figure 2:
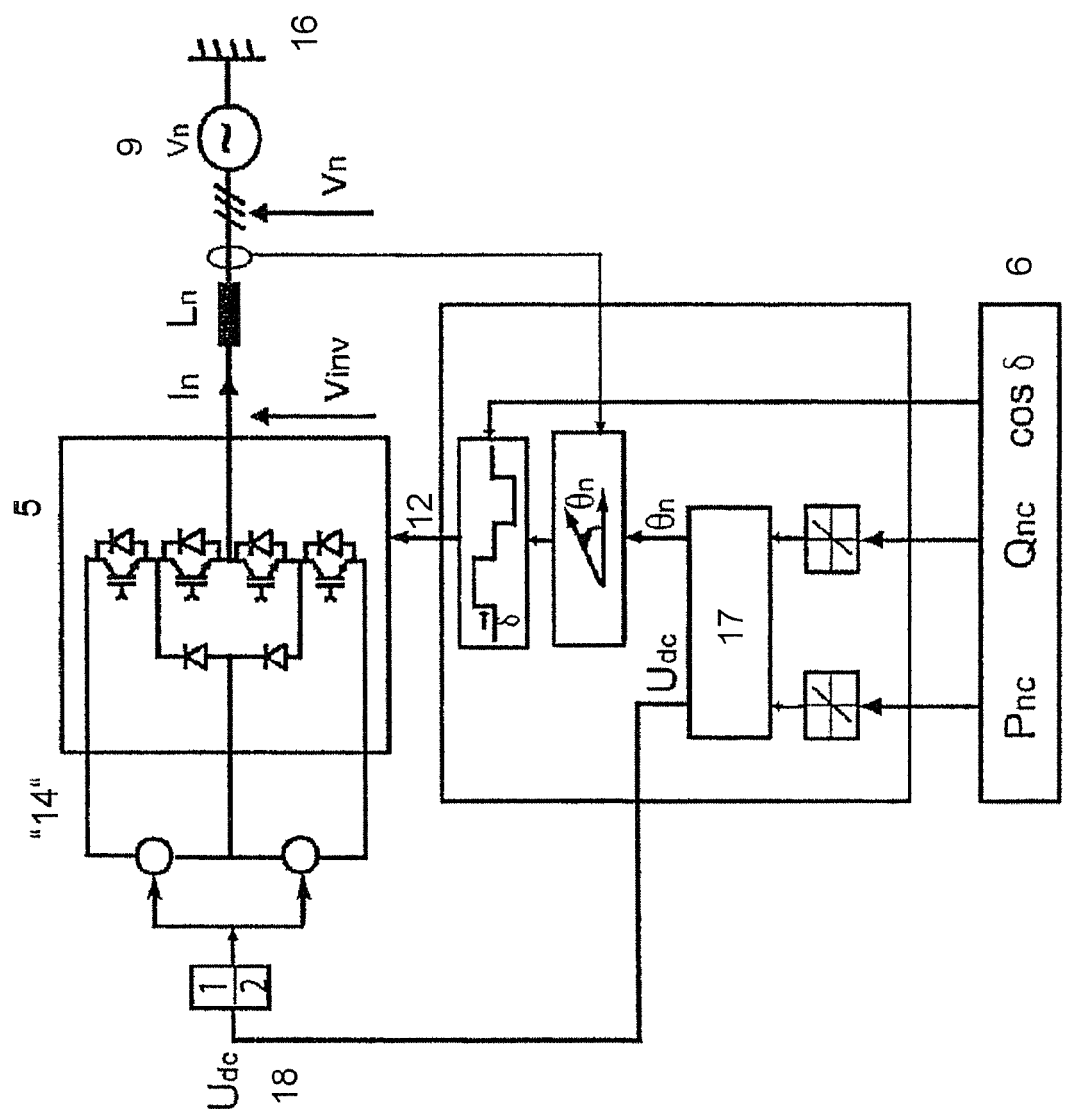
FIG. 2 shows a schematic diagram of an exemplary dedicated control strategy of an inverter part only.

FIG. 2 shows an exemplary principle circuit diagram of a three level NPC inverter, and illustrates a control block.

Figure 3:
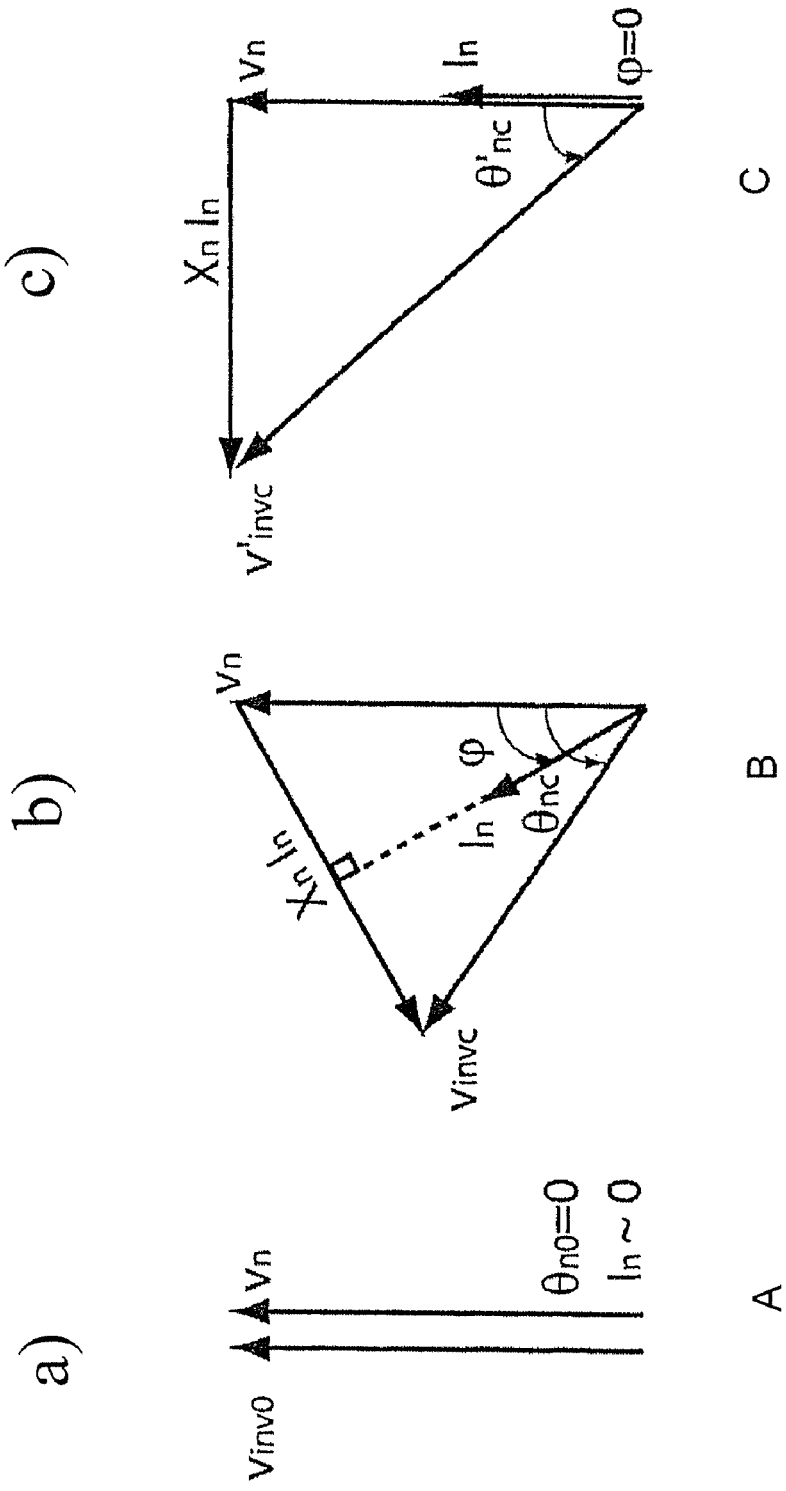
FIG. 3 shows a diagram of voltage and current line side for the three exemplary situations A (a), B (b) and C (c)

This control is based on angular shift between the network and the output inverter voltages, together with voltage magnitude adaptation in the input of the inverter. Three operation modes A, B, and C can be obtained that are presented in vector diagrams in FIGS. 3 a), b) and c), respectively. FIG. 3a) shows a situation for no load, so $P_{nc}=Q_{nc}=0$. FIG. 3b) shows injection of active and reactive power, and FIG. 3 c) shows injection of active power only.

Figure 4:
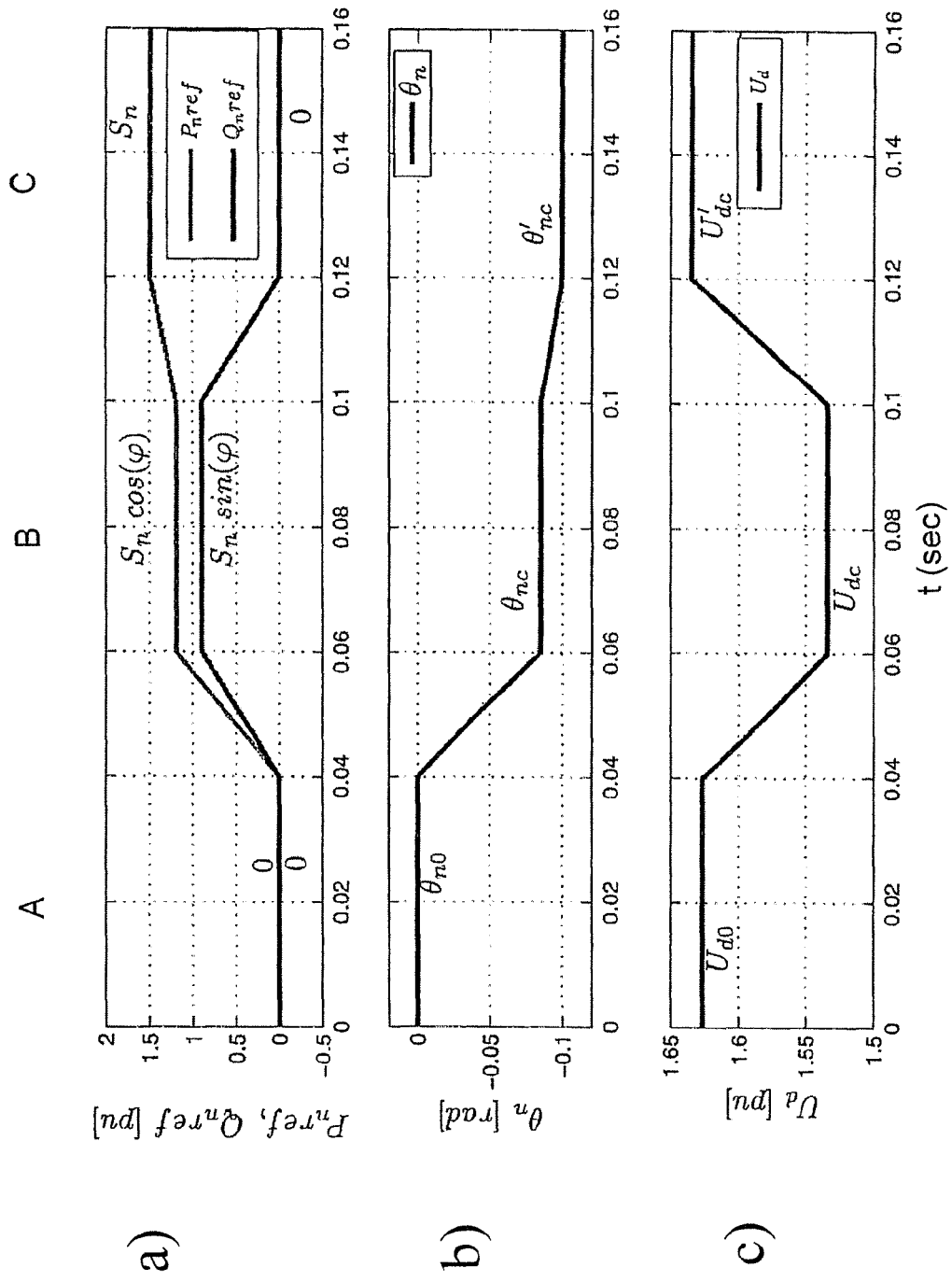
FIG. 4 shows exemplary network side references for the three situations and the transitions therebetween, wherein a) shows active power and reactive power references, b) shows an angle shift reference, and c) shows a DC voltage reference.

FIG. 4 shows exemplary network side references, wherein a) shows active and reactive power references, wherein the upper line shows the active power reference P and the lower line gives the reactive power reference Q, b) shows the angle shift reference, and c) shows DC voltage reference.

Starting from the active and reactive power references, the system runs initially in no load operation (operation mode A), with active and reactive power equal to zero (FIG. 4a). Both inverter and network voltages have the same phase with amplitude equal to nominal (Equation 1). Therefore the current line is very small (FIG. 3-a, mode A).

$$\begin{cases} \theta_{n0} = 0 \\ U_{d0} = \dfrac{\pi}{2\cos\delta} V_n \end{cases} \quad (1)$$

In the first transition at t=0.04 s between modes A and B, network active and reactive power are ramped to $P_{nc}=S_n\times\cos\phi$ and to $Q_{nc}=S_n\times\sin\phi$ respectively. Consequently the angle shift and the continuous voltage change from $(\theta_{n0}, U_{d0})$ to $(\theta_{nc}, U_{dc})$ in mode B (FIG. 3b and FIGS. 4b and c) with $\theta_{nc}$ being the target phase angle after transition between the inverter voltage $V_{inv}$ and a load voltage $V_n$. Their values depend on the active and reactive power references (Equation 2).

$$\begin{cases} \theta_n = \arctan\left(\dfrac{P_{nc}}{\dfrac{3}{2}\dfrac{V_n^2}{X_n} - Q_{nc}}\right) \\ U_d = \dfrac{\pi}{2\cos\delta}\sqrt{\left(V_n - \dfrac{2}{3}\dfrac{X_n}{V_n}Q_{nc}\right)^2 + \left(\dfrac{2}{3}\dfrac{X_n}{V_n}P_{nc}\right)^2} \end{cases} \quad (2)$$

In the second transition at t=0.1 s between B and C, the reactive power Q ramps down to zero as illustrated in FIG. 4a. Consequently the angle shift and the continuous voltage change from $(\theta_{nc}, U_{dc})$ to $(\theta'_{nc}, U'_{dc})$. Then the reactive power Q can be compensated and the system can be operated using a unity power factor.

However the line current can contain some DC component due to the transients.

To address this issue, the transition of active and reactive power references should not be rapid. If the transition time $T_{tr}$, is relatively long compared to the fundamental period ($T_f$=20 ms), the current may be considered as symmetrical, and the DC component can be neglected.

One question is as follows: How fast is the slew rate of the current transient allowed to be in Square Wave Modulation?

3 Fast-ramping DC Elimination Strategy for AC Currents

A study by using a simple circuit proves that for a particular choice of $T_{tr}$, the DC component can be (or can effectively be considered to be) equal to zero.

3.1 Simple System

Figure 5:
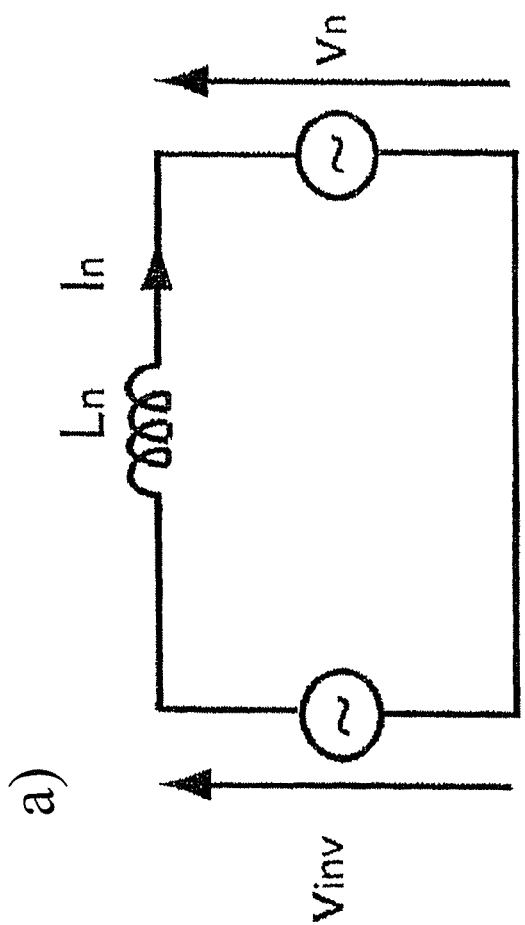
FIG. 5 a) shows an exemplary simplified circuit for the calculations, and b) a corresponding vector diagram.
Figure 5:
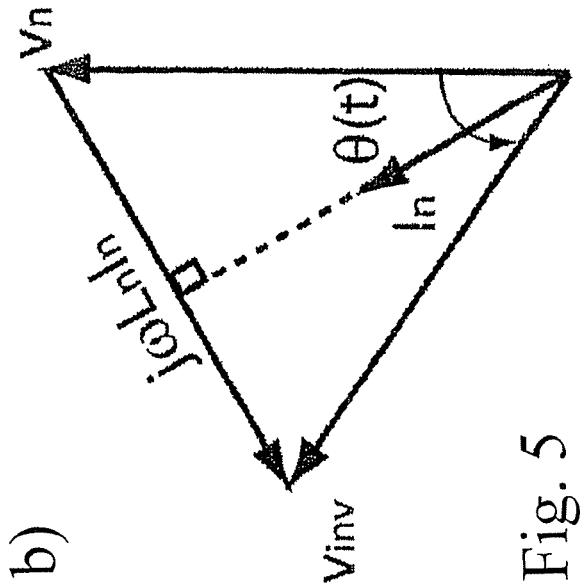
Figure 6:
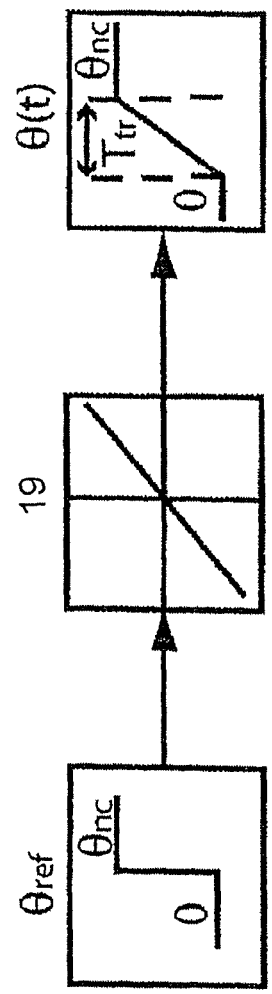
FIG. 6 shows an exemplary transition time limiter.

As an example a simple circuit (see FIG. 5 a, the corresponding vector diagram is given in FIG. 5 b) shall be considered, in which:

the output voltage is: $V_n(t) = \sin\omega t$
the input voltage is: $V_{inv}(t) = \sin(\omega t + \theta(t))$
$\theta(t)$ represents the angle shift between $V_n$ and $V_{inv}$ and this is shown in FIG. 6 (transition time limiter) and it is given by Equation 3:

$$\begin{cases} \theta(t) = \dfrac{\theta_{nc}}{T_{tr}} t & \text{if } t < T_{tr} \\ \theta(t) = \theta_{nc} & \text{if } t \geq T_{tr} \end{cases} \quad (3)$$

The input and the output voltages are connected together through an inductance $L_n$.

It is known that the current generated in the circuit is given by Equation 4:

$$i_n(t) = \dfrac{1}{L_n}\int_0^t (V_{inv}(t) - V_n(t))\, dt \quad (4)$$

(3) can then be inserted into (4) to yield:

$$i_n(t) = \dfrac{1}{L_n\omega}\left(\dfrac{\theta_{nc}}{\omega T_{tr} + \theta_{nc}}\right)(\cos(\omega T_{tr} + \theta_{nc}) - 1) + \dfrac{1}{L_n\omega}\left(\begin{array}{c}\cos\omega t - \\ \cos(\omega t + \theta_{nc})\end{array}\right) \quad (5)$$

On the other hand, the mean value of the current is given by (6):

$$i_{mean} = \frac{1}{T_f} \int_0^{T_f} i_n(t) dt \quad (6)$$

Substituting the current given by (5) into (6), we obtain:

$$i_{mean} = \frac{1}{L_n \omega} \left( \frac{\theta_{nc}}{\omega T_{tr} + \theta_{nc}} \right) (\cos(\omega T_{tr} + \theta_{nc}) - 1) \quad (7)$$

The current's mean value $i_{mean}$ or DC component is composed of two terms and it depends on the transition time $T_{tr}$. The DC component will be equal to zero when one of these terms is zero:

$$\frac{1}{L_n \omega} \left( \frac{\theta_{nc}}{\omega T_{tr} + \theta_{nc}} \right) = 0 \quad (8)$$

Equation 8 will be verified if $T_{tr}$ is relatively long.

$$(\cos(\omega T_{tr} + \theta_{nc}) - 1) = 0 \quad (9)$$

Equation 9 will be verified when $T_{tr}$ is equal to an integer multiple of the fundamental period. $T_{tr}$, in fact is given by Equation 10:

$$T_{tr} = kT_f - \frac{\theta_{nc}}{\omega} \quad (10)$$

with $$T_f = \frac{2\pi}{\omega}$$

and $k = 1, 2, 3 \ldots$

Remark: The analytical calculation is done for fixed input voltage and for the linear ramp, however the system depicted in FIG. 2 is not linear.

3.2 Non Linear System

FIG. 2 illustrates an exemplary control block for a three level inverter. As presented in Section 2, the angle shift between the network 9 and the output inverter voltages, together with DC voltage magnitude in the input of the inverter, are given by Equations 11.

$$\begin{cases} \theta_n(t) = \arctan\left( \frac{P(t)}{\frac{3}{2}\frac{V_n^2}{X_n} - Q(t)} \right) \\ U_d(t) = \frac{\pi}{2\cos\delta} \sqrt{\left(V_n - \frac{2}{3}\frac{X_n}{V_n}Q(t)\right)^2 + \left(\frac{2}{3}\frac{X_n}{V_n}P(t)\right)^2} \end{cases} \quad (11)$$

P(t) and Q(t) are given by Equations 12:

$$\begin{cases} P(t) = \frac{|P_{nc} - P_{n0}|}{T_{tr}} t \\ Q(t) = \frac{|Q_{nc} - Q_{n0}|}{T_{tr}} t \end{cases} \quad (12)$$

Then $\theta_n$ and $U_d$ are not linear.

4 Simulation Results

The system depicted in FIG. 2 has been simulated using the following characteristics: $V_n=1$ pu is the network voltage. $X_n=0.1$ pu: inductance between inverter and network. $S_n=1.5$ pu is the apparent power.

Figure 7:
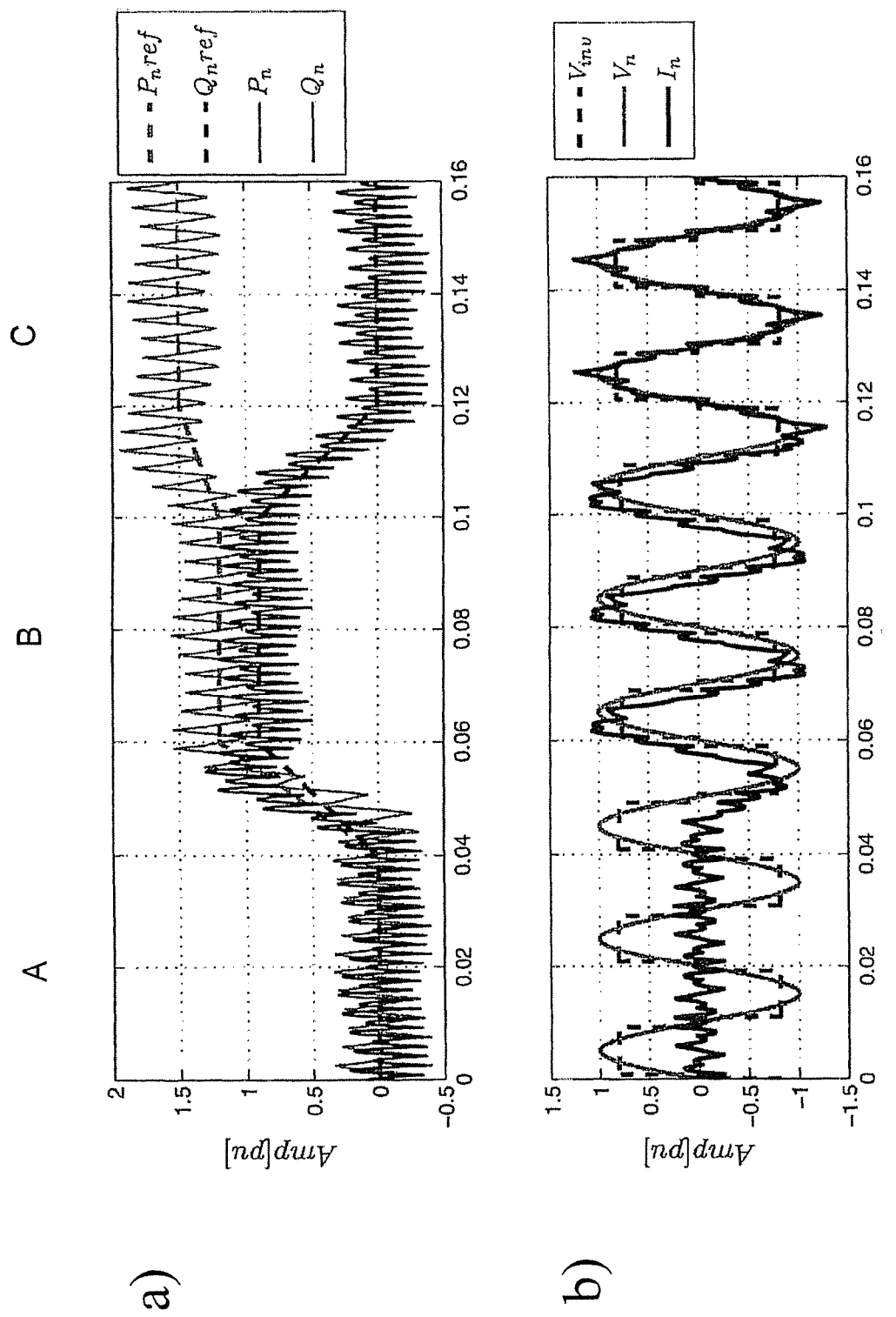
FIG. 7 shows exemplary simulation results, wherein a) shows active and reactive power, and b) shows network and inverter voltage and line current as a function of time.
Figure 8A:
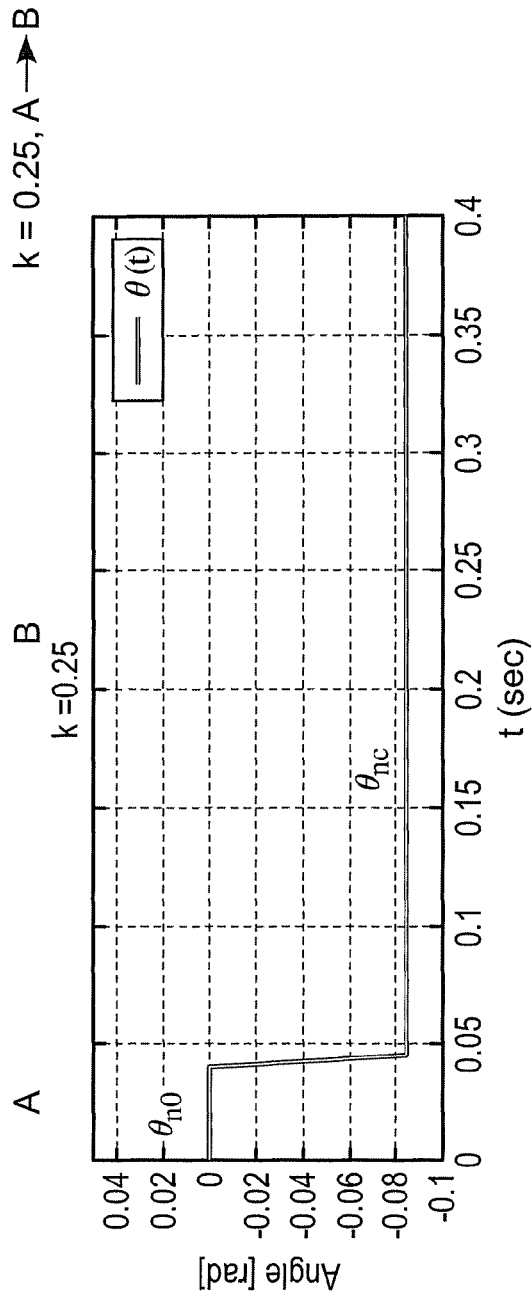
FIG. 8 shows a first transition from A to B for k=0.25, wherein a) shows angle shift and b) shows current.
Figure 8B:
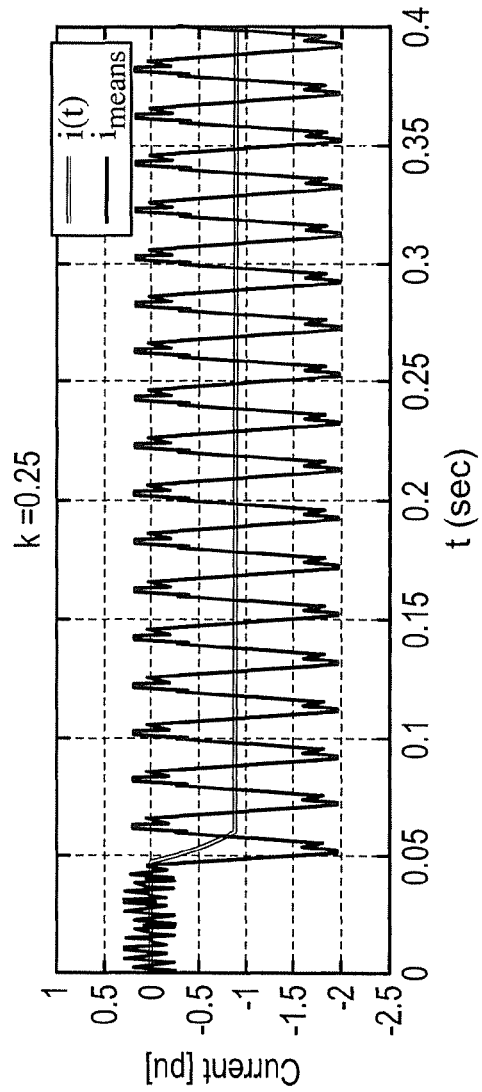
Figure 9A:
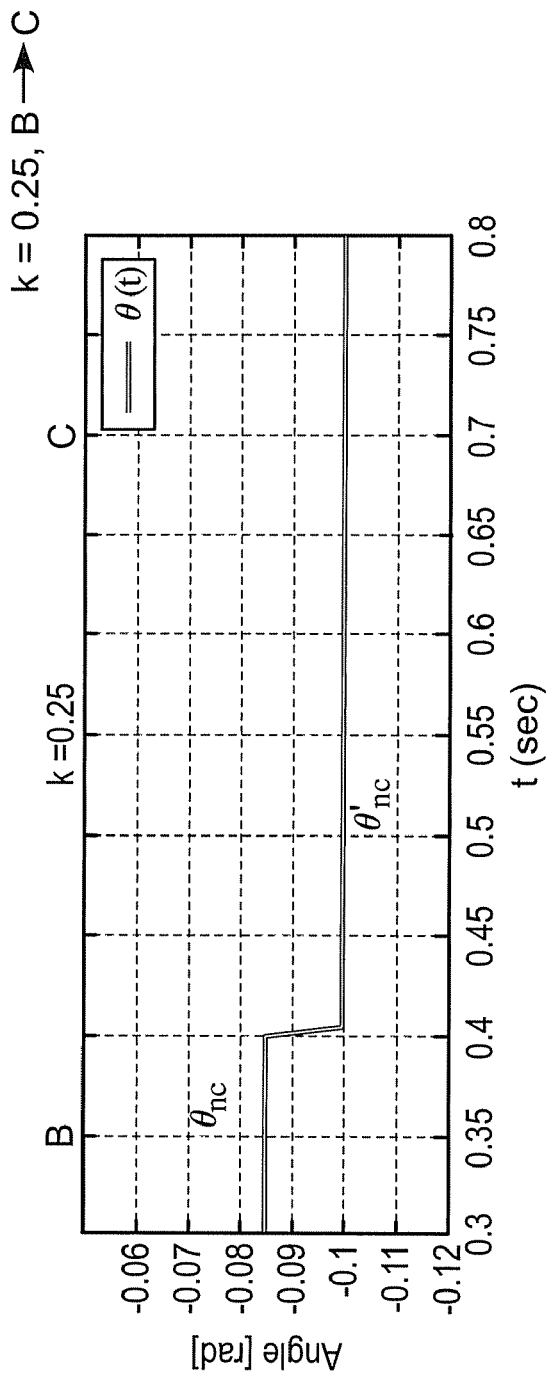
FIG. 9 shows a second transition from B to C for k=0.25, wherein a) shows angle shift and b) shows the current.
Figure 9B:
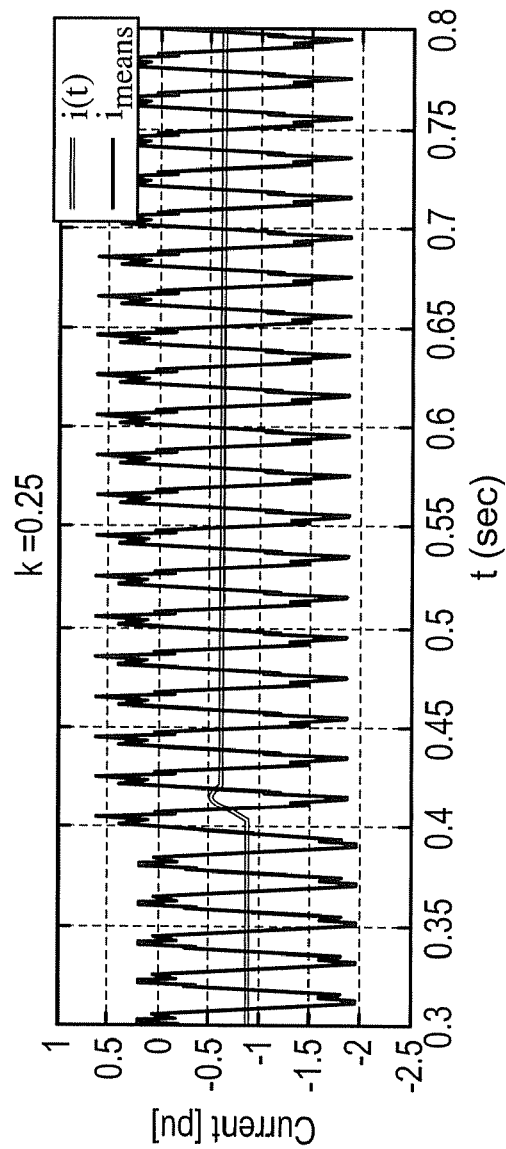
Figure 10A:
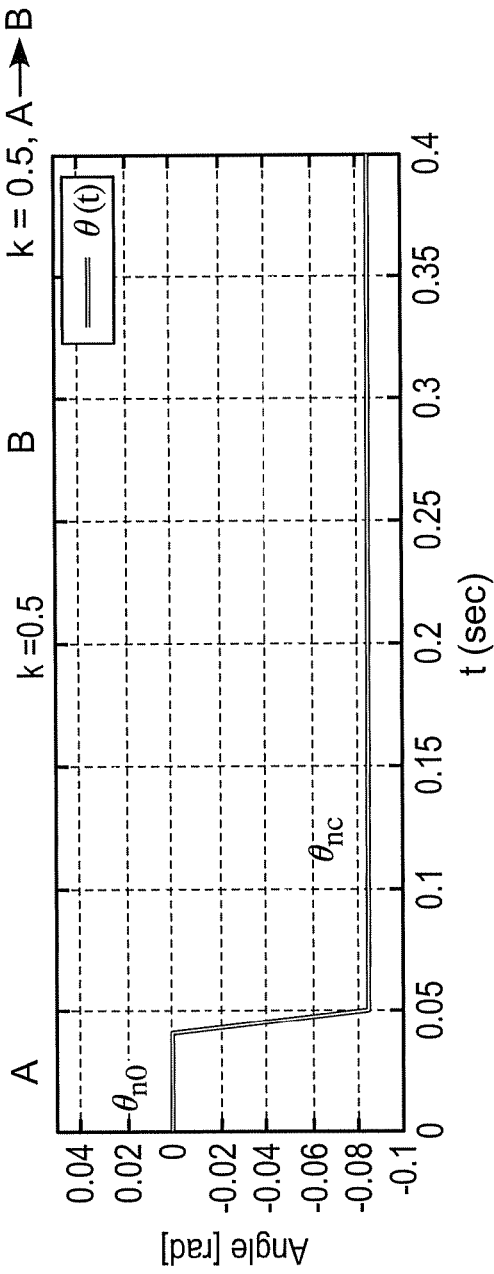
FIG. 10 shows the first transition from A to B for k=0.5, wherein a) shows the angle shift and b) shows the current.
Figure 10B:
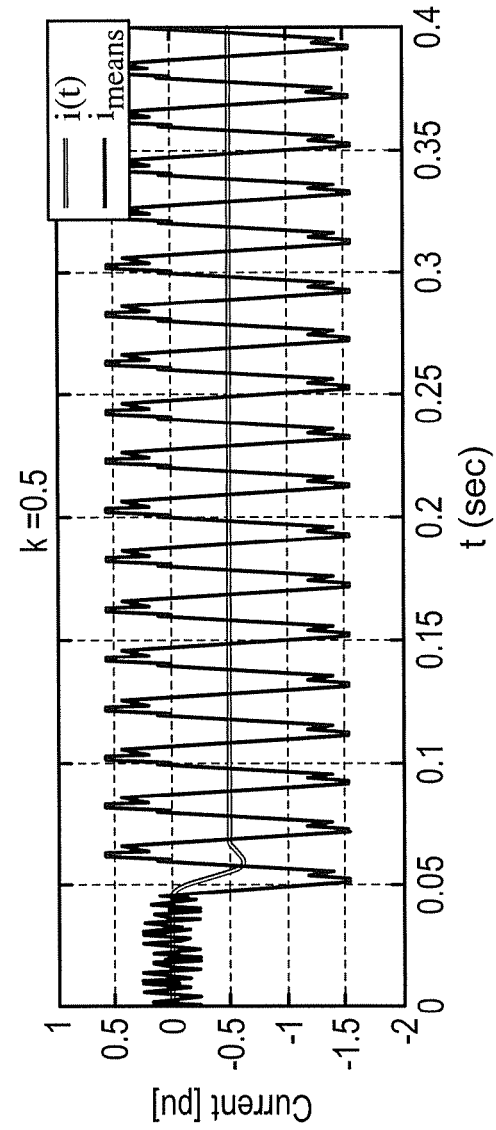
Figure 11A:
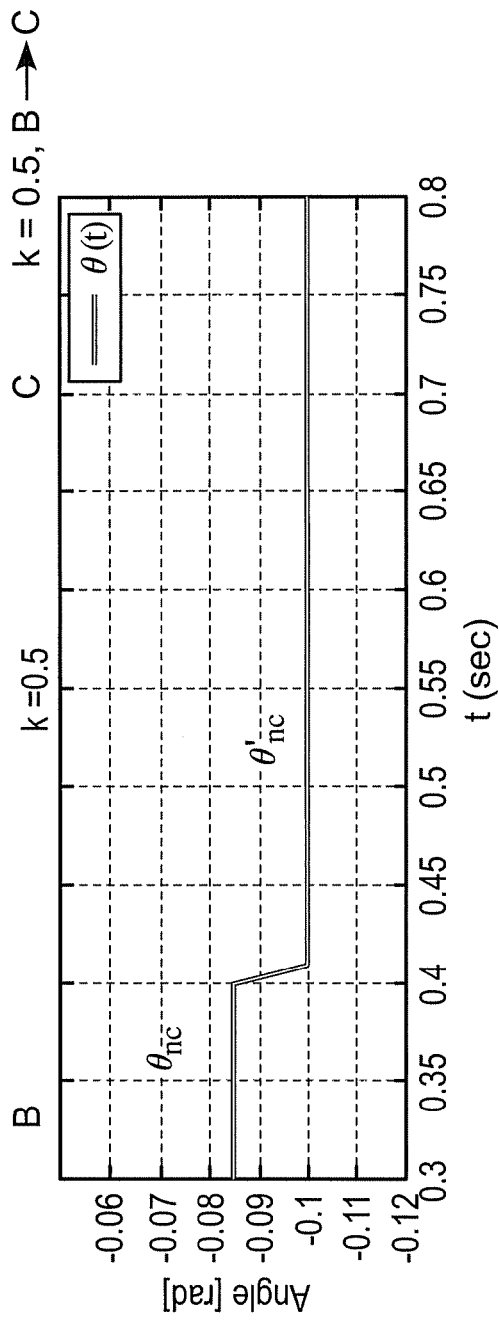
FIG. 11 shows the second transition from B to C for k=0.5, wherein a) shows the angle shift and b) shows the current.
Figure 11B:
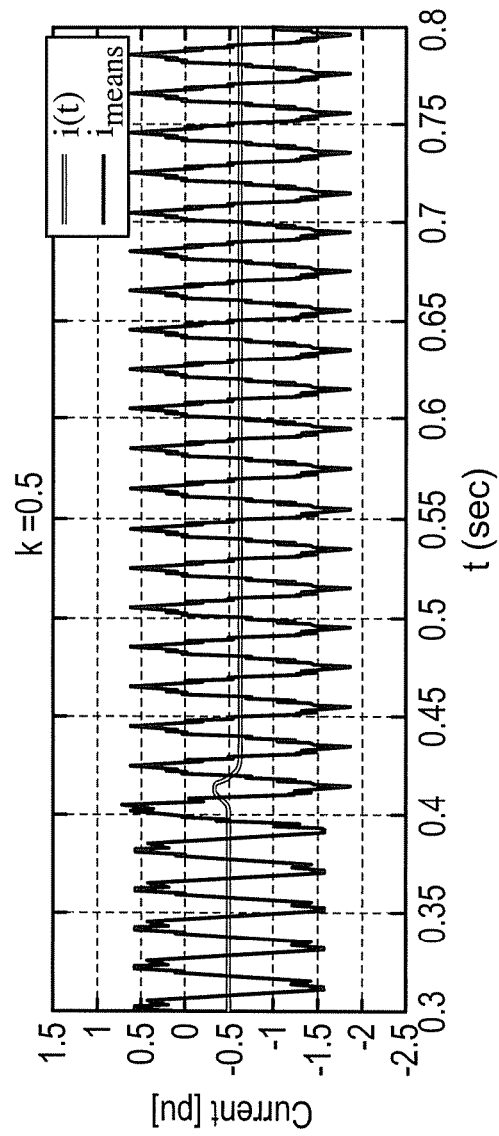
Figure 12A:
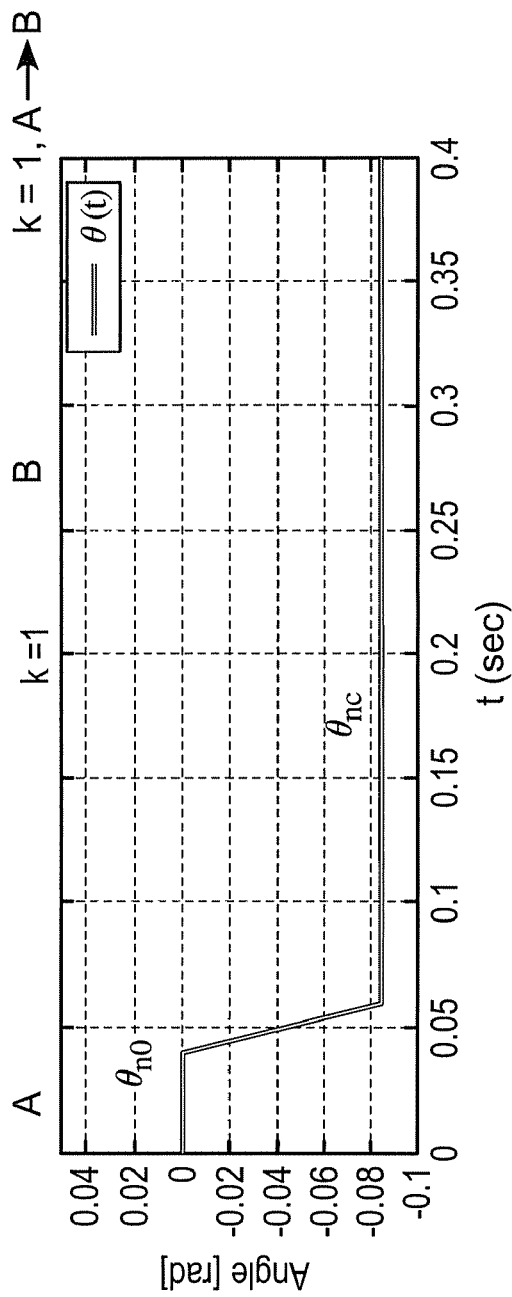
FIG. 12 shows the first transition from A to B for k=1.0, wherein a) shows the angle shift and b) shows the current.
Figure 12B:
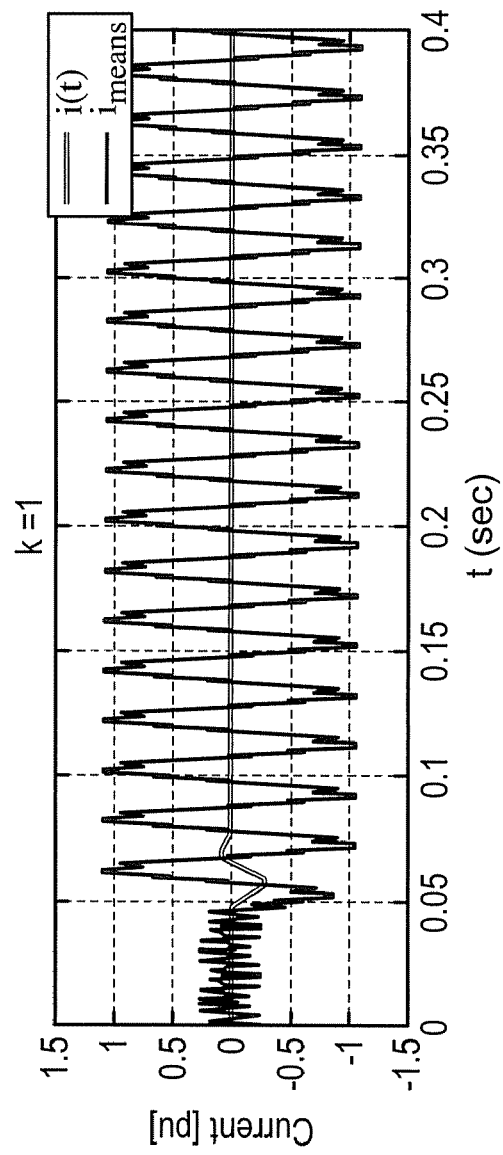
Figure 14A:
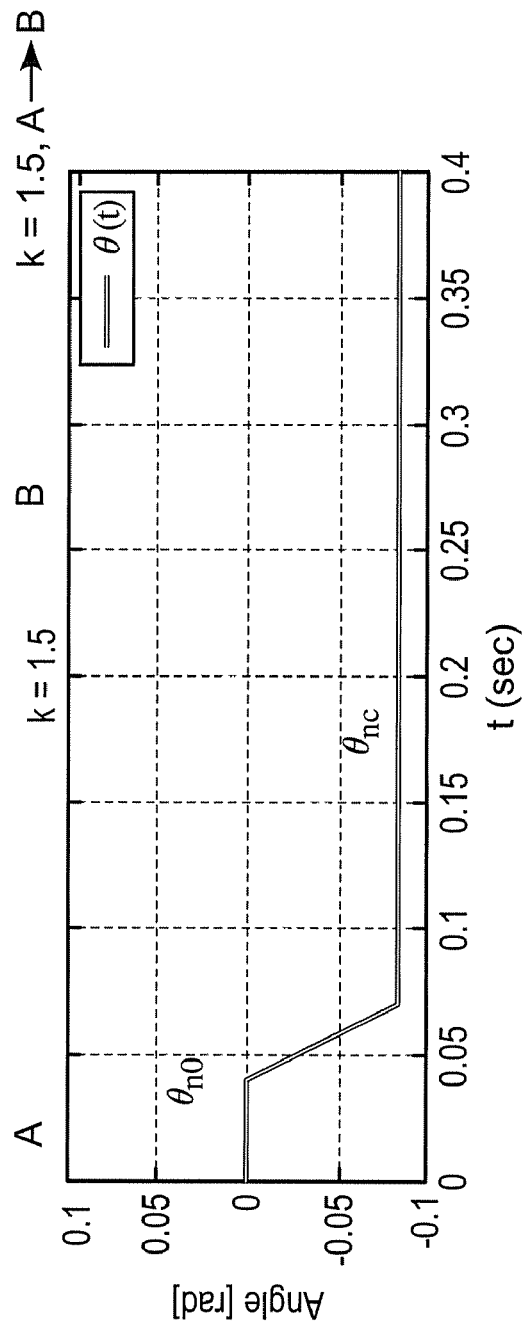
FIG. 14 shows the first transition from A to B for k=1.5, wherein a) shows the angle shift and b) shows the current.
Figure 14B:
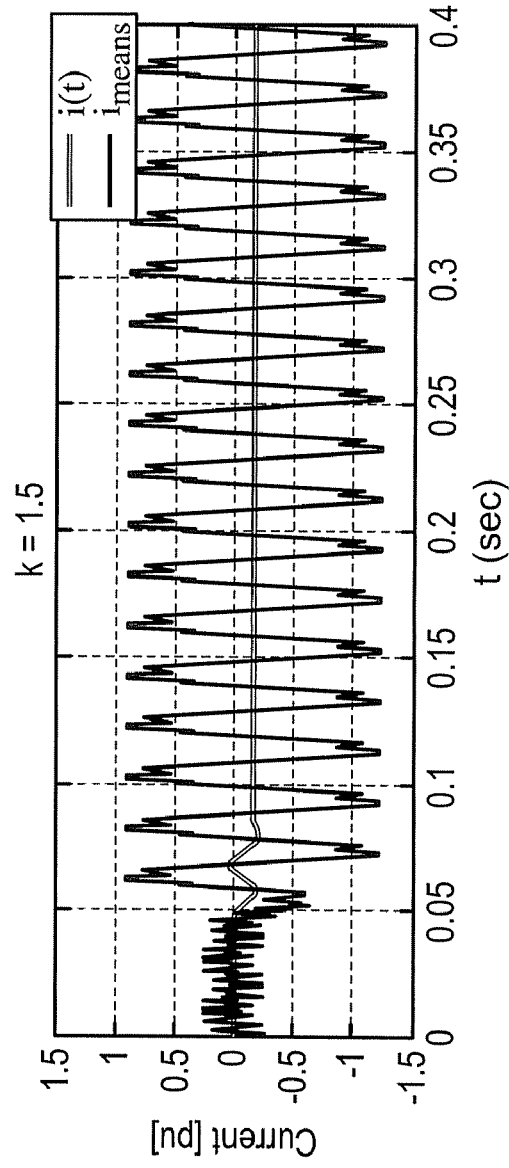
Figure 15A:
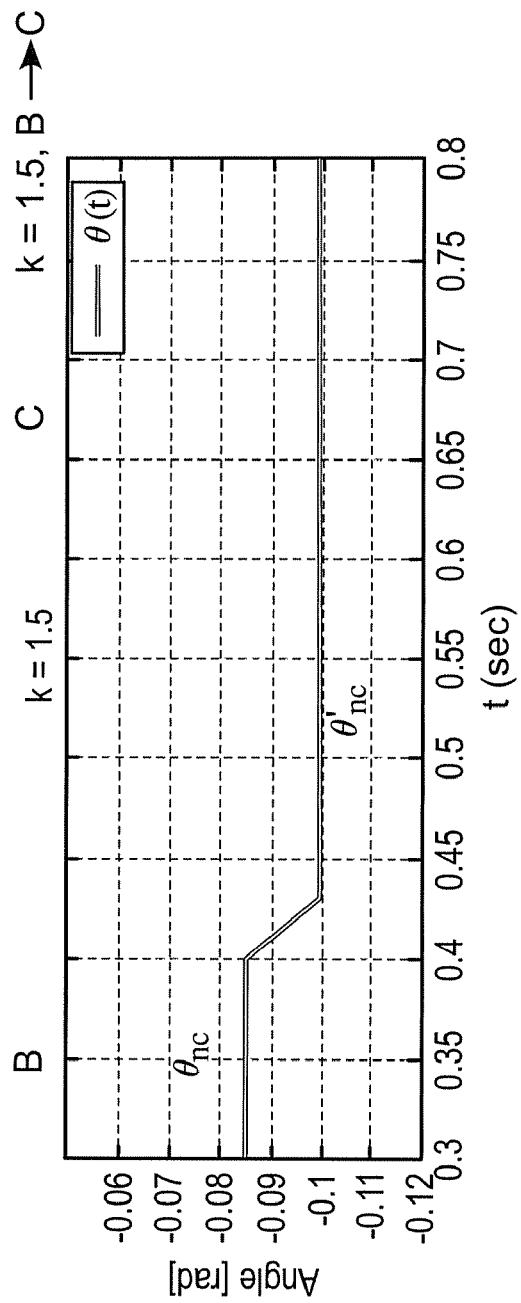
FIG. 15 shows the second transition from B to C for k=1.5, wherein a) shows the angle shift and b) shows the current.
Figure 15B:
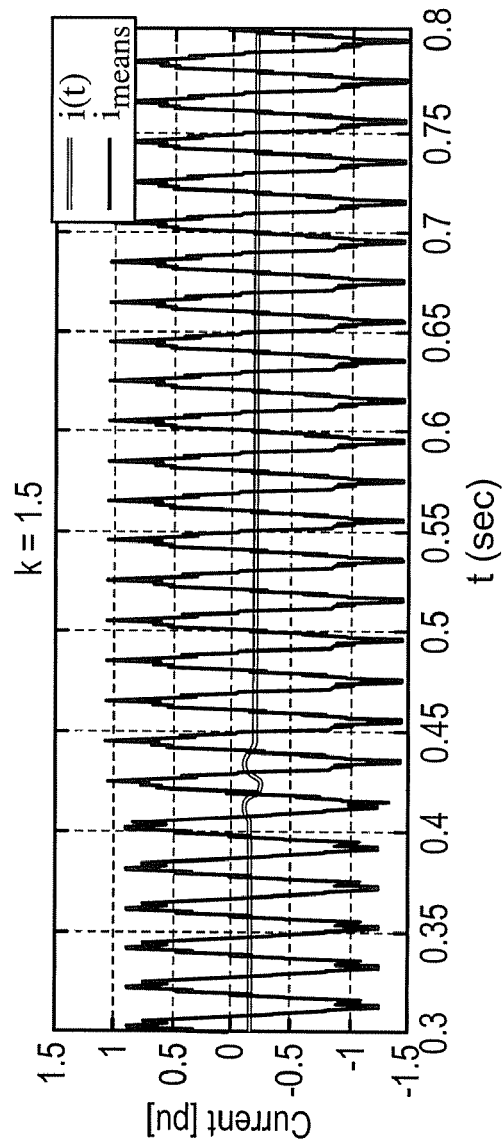
Figure 16A:
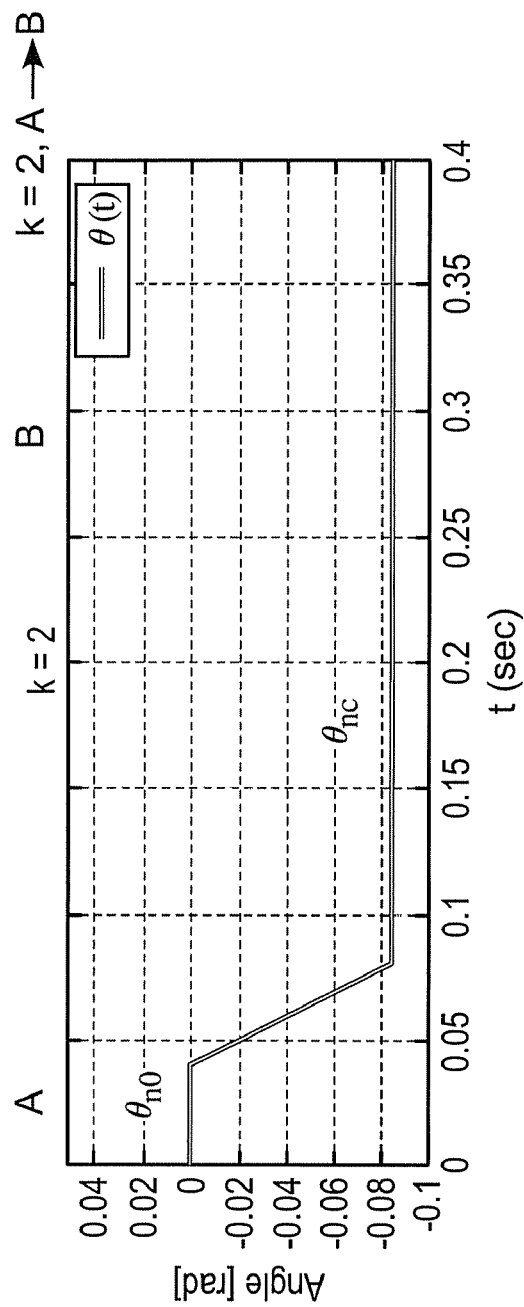
FIG. 16 shows the first transition from A to B for k=2.0, wherein a) shows the angle shift and b) shows the current.
Figure 16B:
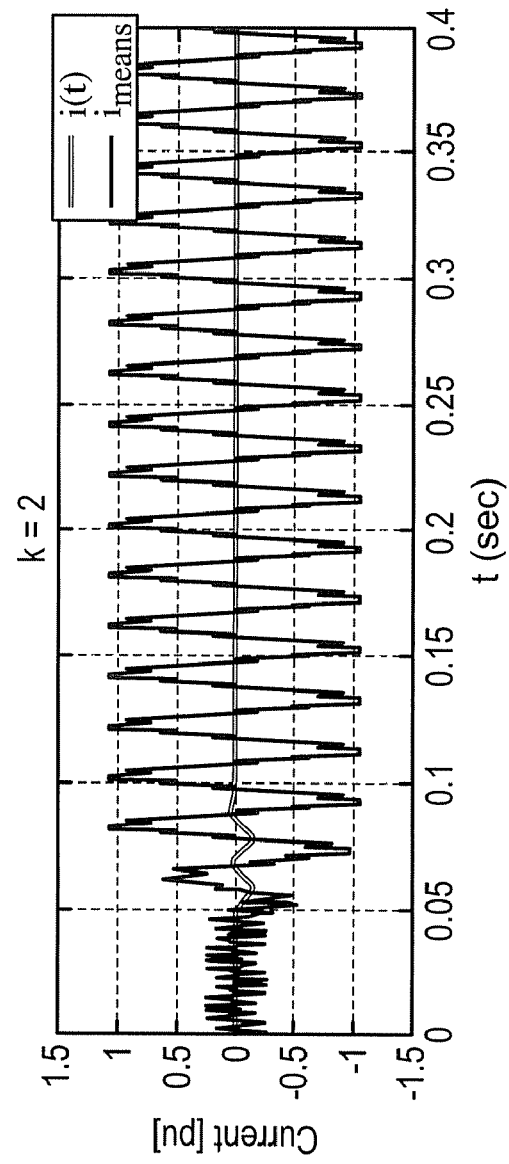

FIG. 7 shows the simulated active P and reactive Q power for three operation modes A, B and C. The line current is in phase with the network voltage when the reactive power Q is zero.

Under the same condition and using the same characteristics, the system has been simulated for different values of transition period $T_{tr}$.

The line current is measured in the first transition at t=0.04 s, when θ(t) changes from $\theta_{n0}$ to $\theta_{nc}$, the system operates with cos φ≠1, FIGS. 8, 10, 12, 14, 16 and 18.

Also it is measured in the second transition at t=0.4 s, when θ(t) changes from $\theta_{nc}$ to $\theta'_{nc}$ and the system operates with cos φ=1, FIGS. 9, 11, 13, 15, 17 and 19.

The simulation results in FIGS. 12, 13, 16 and 17 confirm that the DC component is zero when k is an integer, e.g. k=1, 2, . . . . Otherwise, it is different from zero, e.g. k=0.25, 0.5, 1.5, FIGS. 8, 9, 10, 11, 14, 15.

Figure 18A:
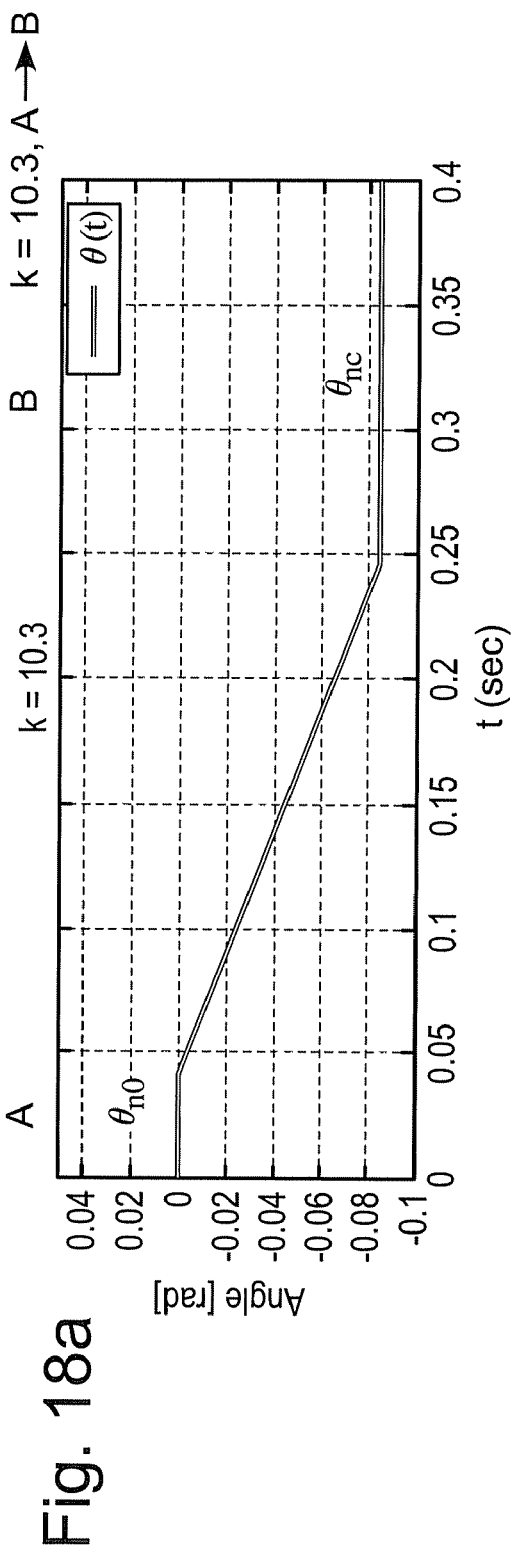
FIG. 18 shows the first transition from A to B for k=10.3, wherein a) shows the angle shift and b) shows the current.
Figure 18B:
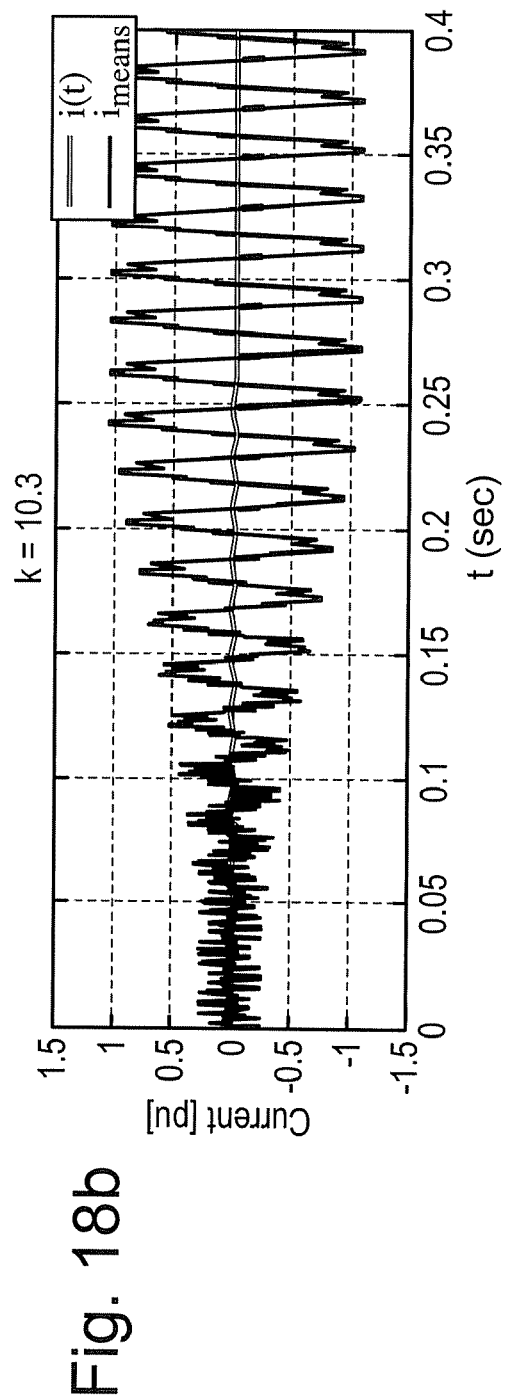
Figure 19A:
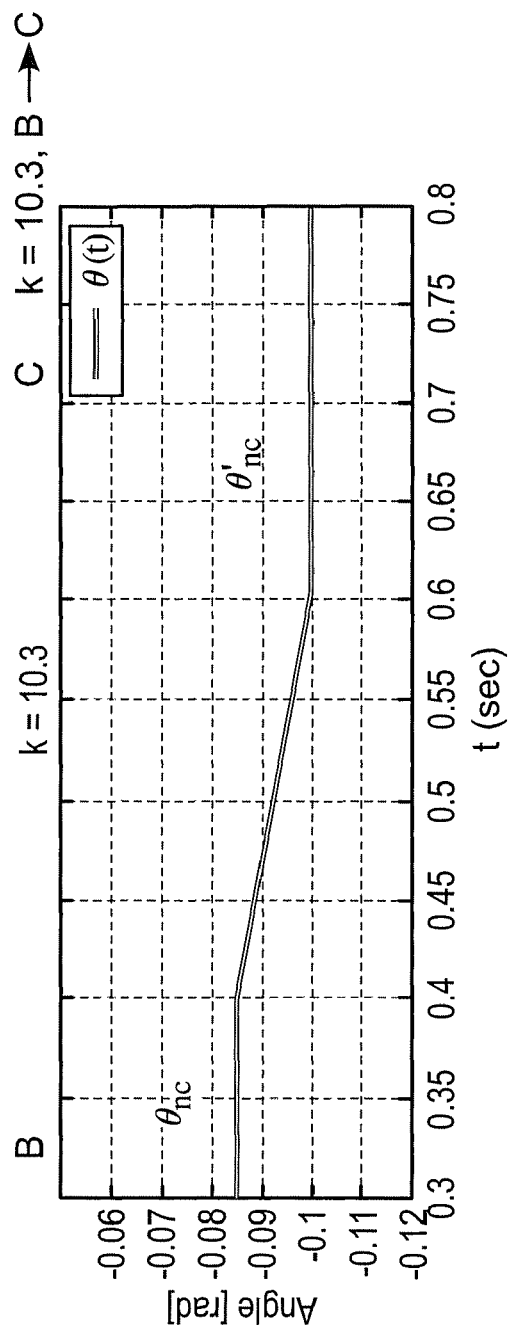
FIG. 19 shows the second transition from B to C for k=10.3, wherein a) shows the angle shift and b) shows the current.
Figure 19B:
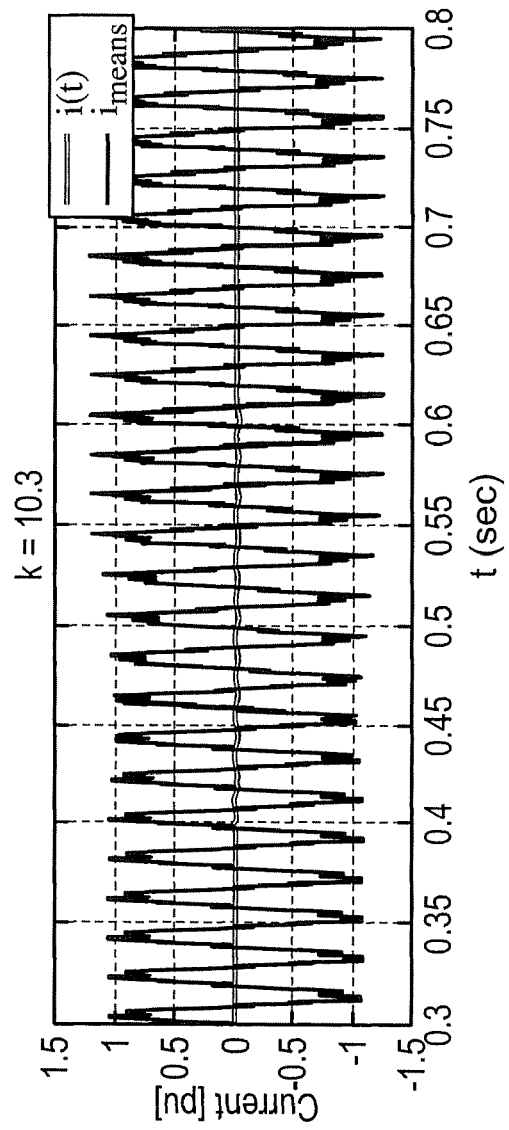

For large values of k, e.g. k=10.3, FIGS. 18, 19, the DC component can be neglected.

5 CONCLUSION

A new system and control strategy are disclosed which can, for example, be used with a three level NPC inverter. The converter can reach any operating point through an angular shift and an adaptation of the continuous voltage. An exemplary advantage is a simple structure. It can be used as an interface between a fast running synchronous generator and the grid, where the ratio between input and output voltage is kept constant by, for example, using a SWM at both the generator and the line side. In an exemplary application, voltage adaptation can be achieved through the generator's excitation. In this application, the line side control strategy is presented. Simulation results with different operating points and transitions between them highlight exemplary capabilities of the proposed control strategy. These include the ability to operate with unity power factor and better current quality without continuous component.

In comparison to the usually slow transient that characterizes a DC component free current transient as shown in FIGS. 18 and 19, it is verified that much faster transients also without DC component can be achieved, simply by choosing a defined transition period equal to an integer multiple of the fundamental period.

The exemplary solution presented here can solve the problem discussed and can be applied to other applications such as a static compensator for statically compensating reactive power.

Figure 17A:
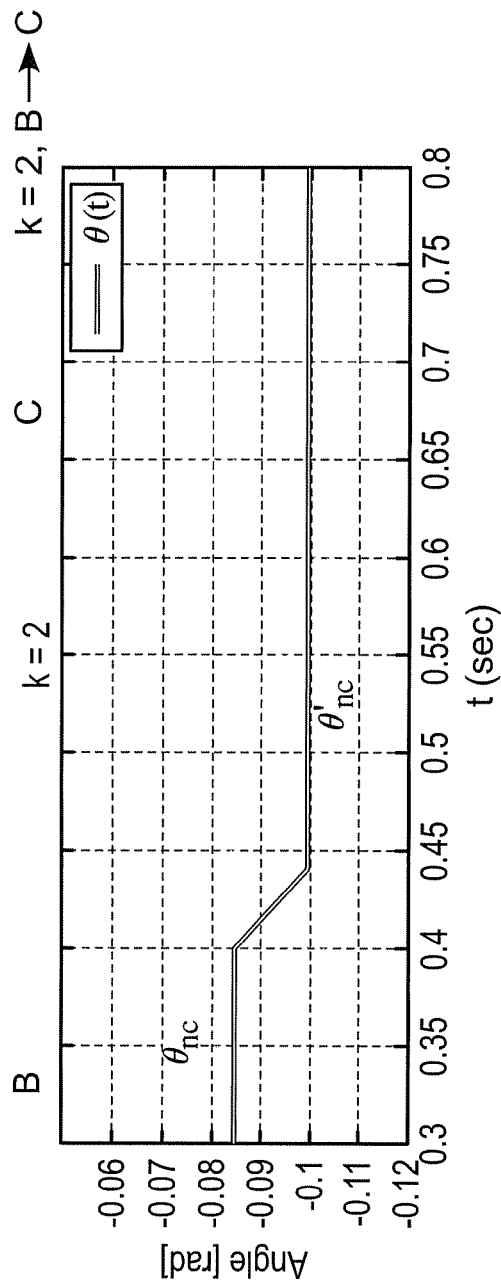
FIG. 17 shows the second transition from B to C for k=2.0, wherein a) shows the angle shift and b) shows the current.
Figure 17B:
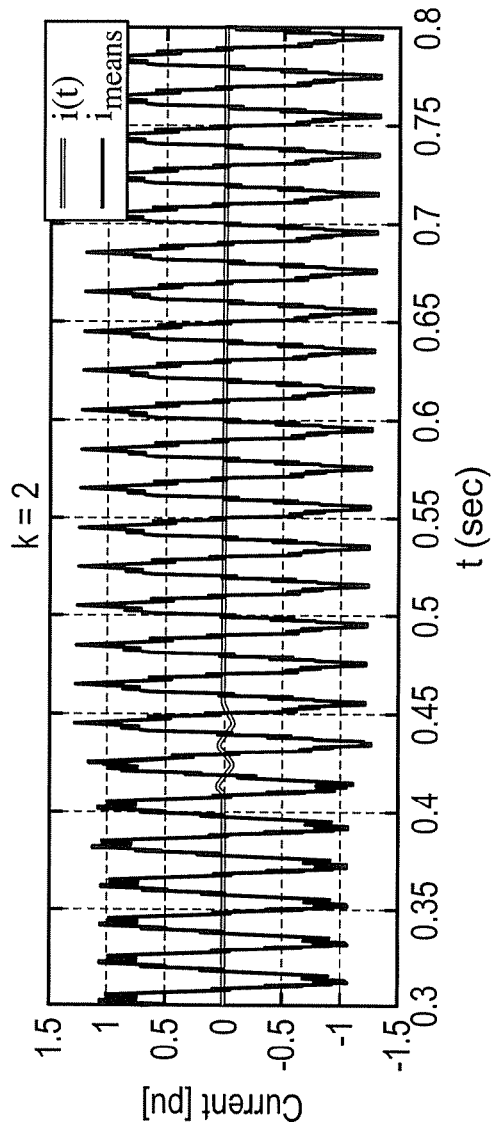

As shown in FIGS. 13 and 17, reactive power can be compensated rapidly and without a DC component in the line current.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 gas turbine
2 synchronous generator
3 position encoder
4 rectifier, a pulse converter, a rectifier stage of the frequency converter
5 inverter, pulse converter, inverter stage of the frequency converter
6 references
7 voltage transducer
8 filter
9 network, grid, load
10 start-up direction
11 energy production direction
12 control lines to rectifier and inverter, gates
13 three level converter
14 DC link, direct current stage of the converter
15 capacitor, capacitance between levels of direct current stage of the converter
16 ground
17 calculation unit
18 DC voltage source, voltage magnitude adaptation of the input of the inverter
19 rate
P active power
Q reactive power
$U_{d0}$ continuous nominal voltage amplitude at no-load
$P_{nc}$ network active power
$Q_{nc}$ network reactive power
$\theta_{no}$ phase angle at no-load
$V_n$ network voltage
$V_{inv}$ inverter voltage
$I_n$ network current
$\theta_{nc}$ phase angle under active and reactive power
$U_{dc}$ voltage amplitude under active and reactive power
$\theta'_{nc}$ phase angle under reactive power
$U_{dc}$ voltage amplitude under reactive power
$T_{tr}$ transition time
$L_n$ inductance
$\theta(t)$ phase angle shift between $V_n$ and $V_{inv}$
$T_f$ fundamental period
PLL phase locked loop
A,B,C operation modes

What is claimed is:

1. A method for controlling an inverter, comprising:
converting, by the inverter, a direct current voltage ($U_{dc}$) into an alternating inverter voltage ($V_{inv}$) with a basic frequency ($\omega$);
supplying, by the inverter, the alternating inverter voltage ($V_{inv}$) to a load, the load providing a load voltage $V_n$ in accordance with the alternating inverter voltage ($V_{inv}$);
calculating a transition time $T_{tr}$ for a change in active power (P) and/or reactive power (Q) within the load in accordance with an equation $$T_{tr} = kT_f - \frac{\theta_{nc}}{\omega};$$

changing the active power (P) and/or the reactive power (Q) within the load in a length of time equivalent to the calculated transition time ($T_{tr}$),
wherein k is substantially an integer number between 1-8,
wherein $T_f$ is a fundamental period and is defined as $$T_f = \frac{2\pi}{\omega},$$

and
wherein $\theta_{nc}$ is a target phase angle, after the changing, between the alternating inverter voltage ($V_{inv}$) and the load voltage ($V_n$).

2. The method according to claim 1, wherein k is substantially an integer number between 1 and 5.

3. The method according to claim 1, wherein k is substantially 1 or 2.

4. The method according to claim 3, comprising:
operating the inverter in basic frequency clocking.

5. The method according to claim 4, wherein the inverter is a multilevel inverter.

6. The method according to claim 5, comprising:
modulating the alternating inverter voltage ($V_{inv}$) in accordance with a square wave.

7. The method according to claim 6, comprising:
rectifying a power output of an alternating current source to produce the direct current voltage ($U_{dc}$), which is converted into the alternating inverter voltage ($V_{inv}$).

8. The method according to claim 7, wherein the converter is a frequency converter and wherein the method comprises:
controlling an output amplitude of the frequency converter using an amplitude of an input of the rectifier and/or by de-phasing between a voltage of the load ($V_n$) and the inverter voltage ($V_{inv}$).

9. The method according to claim 8, comprising:
converting an alternating current generated by a synchronous generator into the direct current voltage ($U_{dc}$) converted by the inverter,
wherein the load is a power grid.

10. The method according to claim 1, comprising:
operating the inverter in basic frequency clocking.

11. The method according to claim 1, wherein the inverter is a multilevel inverter having at least two levels.

12. The method according to claim 1, comprising:
modulating the alternating inverter voltage ($V_{inv}$) in accordance with a square wave.

13. The method according to claim 1, comprising:
rectifying a power output of an alternating current source to produce the direct current voltage ($U_{dc}$), which is converted into the alternating inverter voltage ($V_{inv}$).

14. The method according to claim 13, comprising:
modulating the alternating inverter voltage ($V_{inv}$) in accordance with a first square wave; and
modulating the rectification of the power output of the alternating current source in accordance with a second square wave,
wherein the power output of the alternating current source has a frequency different from the basic frequency ($\omega$) of the alternating inverter voltage ($V_{inv}$).

15. The method according to claim 13, wherein the converter is a frequency converter and wherein the method comprises:

controlling an output amplitude of the frequency converter using an amplitude of an input of the rectifier and/or by de-phasing between a voltage of the load ($V_n$) and the inverter voltage ($V_{inv}$).

16. The method according to claim 13, wherein the inverter is a multilevel inverter having at least two levels.

17. The method according to claim 1, comprising:

converting an alternating current generated by a synchronous generator into alternating current for provision to a power grid via the inverter.

18. The method according to claim 1, comprising:

statically compensating for reactive power via the inverter.

19. The method according to claim 1, wherein the target phase angle $\theta_{nc}$ is greater than or less than zero.

20. A system for controlling an inverter configured to convert a direct current voltage ($U_{dc}$) into an alternating inverter voltage ($V_{inv}$) with a basic frequency ($\omega$), the system comprising:

a control unit configured to:

calculate, in accordance with an equation $$T_{tr} = kT_f - \frac{\theta_{nc}}{\omega},$$

a transition time $T_{tr}$ for a change in active power (P) and/or reactive power (Q) within a load to be supplied the alternating inverter voltage ($V_{inv}$); and generate control signals configured to change the active power (P) and/or the reactive power (Q) within the load in a length of time equivalent to the calculated transition time ($T_{tr}$, wherein the load provides a load voltage ($V_n$) in accordance with the alternating inverter voltage ($V_{inv}$), wherein k is substantially an integer number between 1-8, wherein $T_f$ is a fundamental period and is defined as $$T_f = \frac{2\pi}{\omega},$$

and wherein $\theta_{nc}$ is a target phase angle after a transition between the alternating inverter voltage ($V_{inv}$) and the load voltage ($V_n$).

21. The system according to claim 20, comprising the inverter, wherein the inverter is a multilevel inverter configured to modulate the alternating inverter voltage ($V_{inv}$) in accordance with a square wave.

22. The system according to claim 20, comprising:

a synchronous generator driven by a gas turbine, the synchronous generator configured to output an alternating current; and a rectifier configured to rectify the alternating current and to output the direct current voltage ($U_{dc}$) converted into the alternating inverter voltage ($V_{inv}$).

23. The system according to claim 20, wherein the target phase angle $\theta_{nc}$ is greater than or less than zero.

* * * * *